US009736889B2

(12) United States Patent
Zack

(10) Patent No.: US 9,736,889 B2
(45) Date of Patent: Aug. 15, 2017

(54) APPARATUS AND METHOD FOR THE OHMIC HEATING OF A PARTICULATE LIQUID

(71) Applicant: FRUIT TECH NATURAL S.A., Espinardo (Murcia) (ES)

(72) Inventor: Yoram Zack, Espinardo (ES)

(73) Assignee: FRUIT TECH NATURAL S.A., Espinardo (Murcia) (ES)

( * ) Notice: Subject to any disclaimer, the term of this patent is extended or adjusted under 35 U.S.C. 154(b) by 194 days.

(21) Appl. No.: 14/403,153

(22) PCT Filed: May 22, 2013

(86) PCT No.: PCT/EP2013/060552
§ 371 (c)(1),
(2) Date: Nov. 21, 2014

(87) PCT Pub. No.: WO2013/174890
PCT Pub. Date: Nov. 28, 2013

(65) Prior Publication Data

US 2015/0153069 A1 Jun. 4, 2015

(30) Foreign Application Priority Data

May 23, 2012 (EP) .................................... 12382193

(51) Int. Cl.
*H05B 3/60* (2006.01)
*A47J 31/00* (2006.01)
(Continued)

(52) U.S. Cl.
CPC ............... *H05B 3/00* (2013.01); *F24H 1/106* (2013.01); *H05B 3/0009* (2013.01); *H05B 3/60* (2013.01);
(Continued)

(58) Field of Classification Search
None
See application file for complete search history.

(56) References Cited

U.S. PATENT DOCUMENTS 535,267 A * 3/1895 Wagner et al. ..... C02F 1/46109 204/275.1
2,680,802 A * 6/1954 Bremer .................. A47J 31/40 222/129.1
(Continued)

FOREIGN PATENT DOCUMENTS

GB 2301271 A 11/1996
JP H0739320 A 2/1995
JP H07039320 A 2/1995

OTHER PUBLICATIONS

International Search Report and Written Opinion for PCT/EP2013/060552, European Patent Office, mailed Aug. 19, 2013, pp. 1-10, Rijswijk, NL.

*Primary Examiner* — Thor Campbell
(74) *Attorney, Agent, or Firm* — Peter B. Scull; Hamilton, DeSanctis & Cha LLP

(57) ABSTRACT

An electrode for the ohmic heating of a particulate liquid flowing therethrough having an inlet and an outlet that are fluidly connected and are arranged in such a way that there is a change of direction of 60°-120° between the inlet and the outlet. A cell for the ohmic heating of a particulate liquid flowing therethrough may have two such electrodes and a dielectric tube that fluidly connects the two electrodes. An apparatus for the ohmic heating of a particulate liquid flowing therethrough may have six such cells that are fluidly connected in series and are electrically connected to a triphasic power supply, so that the increase of temperature of the liquid at any cell is substantially the same.

18 Claims, 4 Drawing Sheets

(51) Int. Cl.
*H05B 3/00* (2006.01)
*F24H 1/10* (2006.01)

(52) U.S. Cl.
CPC .... *F24H 2250/10* (2013.01); *H05B 2203/021* (2013.01)

(56) References Cited

U.S. PATENT DOCUMENTS

| | | | | | |
|---|---|---|---|---|---|
| 2,836,699 | A * | 5/1958 | Mullin | F24H 1/106 | 392/318 |
| 3,666,917 | A * | 5/1972 | Oglesby | F24H 1/106 | 392/311 |
| 3,843,950 | A * | 10/1974 | Schladitz | F24H 1/101 | 219/552 |
| 3,867,610 | A * | 2/1975 | Quaintance | F24H 1/106 | 338/83 |
| 3,925,638 | A * | 12/1975 | Scatoloni | F24H 1/106 | 204/196.05 |
| 4,119,833 | A * | 10/1978 | Welch | H05B 3/60 | 338/83 |
| 5,222,185 | A * | 6/1993 | McCord, Jr. | F24H 1/106 | 219/601 |
| 5,583,960 | A * | 12/1996 | Reznik | A23B 5/01 | 219/771 |
| 5,636,317 | A * | 6/1997 | Reznik | A23B 5/01 | 392/312 |
| 5,863,580 | A * | 1/1999 | Reznik | A23B 5/01 | 426/237 |
| 6,130,990 | A * | 10/2000 | Herrick | H05B 3/60 | 392/312 |
| 6,421,501 | B2 * | 7/2002 | Berthou | H05B 3/60 | 165/167 |
| 6,522,834 | B1 * | 2/2003 | Herrick | H05B 3/60 | 222/251 |
| 7,050,706 | B2 * | 5/2006 | Israelsohn | F24H 1/106 | 392/314 |
| 8,565,588 | B2 * | 10/2013 | Bierbaumer | F24H 1/106 | 392/311 |
| 2013/0315574 | A1 * | 11/2013 | Pain | A23L 3/005 | 392/314 |

* cited by examiner

APPARATUS AND METHOD FOR THE OHMIC HEATING OF A PARTICULATE LIQUID

The developments hereof are related to an electrode for the ohmic heating of a particulate liquid flowing therethrough, and also to an apparatus comprising such electrodes. The developments are further related to a method of heating a flowing conductive liquid.

In the context of the present disclosure, a 'liquid' is meant to be an electrically conductive liquid and to encompass particulate liquids, i.e., liquids having solid particles mixed therein, e.g. pulpy juices. But of course the developments hereof are just as suitable for non-particulate liquids.

BACKGROUND

It is known to heat a conductive liquid by circulating an electric current therein through a pair of electrodes, the conductive liquid being the resistive element which is electrically heated. This is called ohmic or resistive heating and has been applied to the sterilisation of foodstuffs such as fruit juices. With this technology heating is more uniform and can be completed in a very short time, but problems may arise.

For instance, if current density (electric current divided by area of electrode) is too high arcing may occur, leading to the heating of the electrode and the consequent pollution of the foodstuffs with particles from the electrode. Arcing is the occurrence of an electric arc, i.e. an electrical breakdown of a gas resulting from a current flowing through normally non-conductive media, such as air.

U.S. Pat. No. 5,583,960 acknowledges that "many of the difficulties encountered heretofore in electroheating have been caused by phenomena occurring at and adjacent the electrode surfaces when the electrodes are subjected to relatively high current densities", and discloses an apparatus that "may include a dielectric structure defining an elongated first conduit having inlet and outlet ends and may also include means defining first and second electrode surfaces disposed adjacent to ends of the first conduit so that a conductive fluid material passing through the first conduit will contact the first and second electrode surfaces ( . . . ) both of the electrode surfaces are disposed outside of the adjacent end of the first conduit and at a substantially uniform distance from the conduit and each of the electrode surfaces has area greater than the mean cross-sectional area of the conduit ( . . . ) each electrode surface is generally in the form of a surface region of a sphere having its centre on the central axis of the adjacent conduit end ( . . . ) the dielectric structure desirably includes a transition section associated with each end of the conduit, the transition section extending from the end of the conduit towards the electrode surface of the electrode associated with such conduit end ( . . . ) this wall structure may be generally in the form of a surface of revolution such as a cone, paraboloid or the like having progressively increasing diameter in the direction from the end of the conduit towards the electrode surface ( . . . ) and is connected to the electrode around the periphery of the electrode surface. The electrode may have one or more ports extending through the electrode surface so that a conductive fluid to be heated can be passed through the port of one electrode, through one transition conduit, through the first conduit and through the other transition conduit and the port of the other electrode ( . . . ) the axes of the ports slope in the same direction with respect to the central axis of the conduit, so that the ports are disposed in a generally helical pattern", in view to reduce the current density on the electrodes' surface.

But found and disclosed here is the development that when heating a particulate liquid (for example orange juice with pulp stuff) with the apparatus of U.S. Pat. No. 5,583,960, both calcined pulp and particles of electrode appear in the heated liquid, and after some time the outer surface of the electrode that is in contact with the liquid is corroded, specially at the periphery. This last detail is particularly worrying because there is a seal between the flat periphery of said surface of the electrode and the transition section of the dielectric structure, and thus the damage to the electrode can also be damaging to the seal.

SUMMARY

It is an aspect hereof to provide an electrode configuration that avoids, or at least limits, the drawbacks noted above.

According to a first aspect hereof, the electrode includes an inlet and an outlet that are fluidly connected and are arranged so that there is a change of direction of 60°-120° between the inlet and the outlet, and preferably of 73°-107°. This involves a rather abrupt change of direction of the flow upon passage from the inlet to the outlet, which promotes turbulences that make the contact between the surface of the electrode and the conductive liquid to last longer, and so improves the current transmission between the surface and the liquid and spreads the current more evenly across said surface, thus reducing the currency density on the periphery thereof. In principle, the most preferred angle between the inlet and the outlet is 90°.

In some embodiments, the inlet is a duct and the outlet is a port or vice versa, depending on the sense of the flow, and the port and the duct intersect, so that the port itself splits from the duct at an important angle, which enhances the turbulence.

The port has an outer opening on the outer surface of the electrode where the current transmission takes place. Let's suppose the port is the outlet from the electrode. The abrupt change of direction from the duct to the port causes a turbulence in the flow in and after the port that reduces the forward speed of the liquid in the vicinity of said outer surface, specially near the central region thereof, with the effect that the liquid has a longer contact with the central region of the outer surface and, consequently, more current is transmitted from the electrode to the liquid through said central region and less current is transmitted through the periphery of the outer surface. As explained above, this spreads the current more evenly over said outer surface and reduces the current density on the periphery thereof.

The outer surface of the electrode where the current transmission takes place may be concave, so that the electrical contact between the conductive liquid and the central region of the concave outer surface may be further prolonged.

In an embodiment the ratio between the width of the duct and the width of the port is bigger than 2, and preferably bigger than 3, that is, the cross-section of the duct is much larger than the cross-section of the port. When the port and the duct are cylindrical, said widths are the respective diameters.

In some embodiments, the electrode includes at least six such ports; the ports may diverge as viewed from the duct, in order to enhance the turbulences in the vicinity of the (concave) outer surface. In this case only two ports can split from the duct at an angle of 90°, i.e., the diametrally opposed ones located on the axial direction of the duct.

A cell for the ohmic heating of a particulate liquid flowing therethrough may include two electrodes as the one described in the preceding paragraphs, and a dielectric tube that fluidly connects the two electrodes. The two electrodes can be at a different potential and so an electric current can pass through the liquid flowing from one electrode to the other.

An apparatus for the ohmic heating of a particulate liquid flowing therethrough may include at least a group of three cells as the one described in the previous paragraph, the three cells being fluidly connected in series.

In some embodiments, the middle cell is arranged higher than another cell and lower than the other cell, so that the flow is generally upward. Any cell may be arranged with its dielectric tube in a substantially vertical disposition.

The apparatus may include at least a subsequent group of three cells that is fluidly connected to the antecedent group of three cells, that is, the subsequent group is consecutive to the antecedent group, but not necessarily higher. 'Antecedent' and 'subsequent' refer to the sense of the flow.

In some embodiments, the passage in the dielectric tube of any cell of the subsequent group is narrower than the passage in the dielectric tube of any cell of the antecedent group, so that the heating in the cells of the subsequent group is in principle less intense than the heating in the cells of the antecedent group, because the electrical resistance of a narrow conductor (the cylinder of liquid in the dielectric tube) is higher than the electrical resistance of a wider conductor. In practice, the same heat is delivered to the conductive liquid in the cells of the subsequent group because the liquid is at a higher temperature there than in the cells of the preceding group and, consequently, its conductivity is also higher.

In some embodiments, any two consecutive electrodes pertaining to different cells are connected by a conductive element, i.e., said two electrodes are the same electric point. With triphasic voltage, this means that, when there are two groups of three cells, and consequently 12 electrodes, the first, fourth, fifth, eight, ninth and twelfth electrodes are connected to earth, the second and third electrodes are connected to one phase, the sixth and seventh electrodes are connected to another phase, and the tenth and eleventh electrodes are connected to the other phase.

According to a second aspect hereof, a method of heating a flowing conductive liquid includes the use of an apparatus as described in the preceding paragraphs, wherein the voltage applied to any cell is substantially the same, which means that, in the case of triphasic voltage, there is no need to adjust the voltage of any phase.

In some embodiments, the increase of temperature of the liquid at any cell is substantially the same. This can be achieved, for example, by narrowing the dielectric tube of subsequent cells, as explained above, or, less preferred, by reducing the voltage applied to subsequent cells.

Preferably, the flow in any group of three cells is generally upward, so that the air bubbles that may remain in the liquid and can contribute to arcing are free to go upwards, which facilitates their extraction through the top of any cell.

BRIEF DESCRIPTION OF THE DRAWINGS

Particular embodiments of the present invention will be described in the following, only by way of non-limiting example, with reference to the appended drawings, in which.

DETAILED DESCRIPTION

Figure 1A:
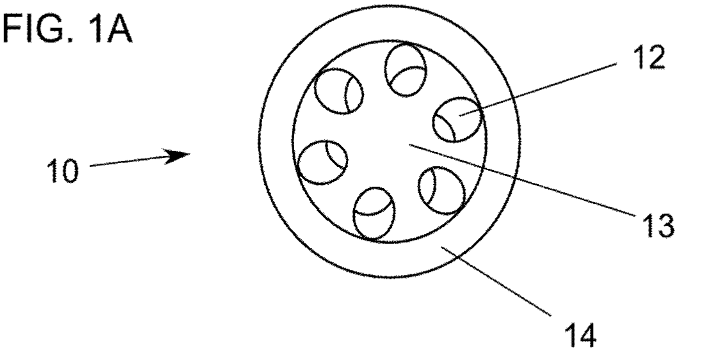
FIG. 1A is a top view of an electrode.
Figure 1B:
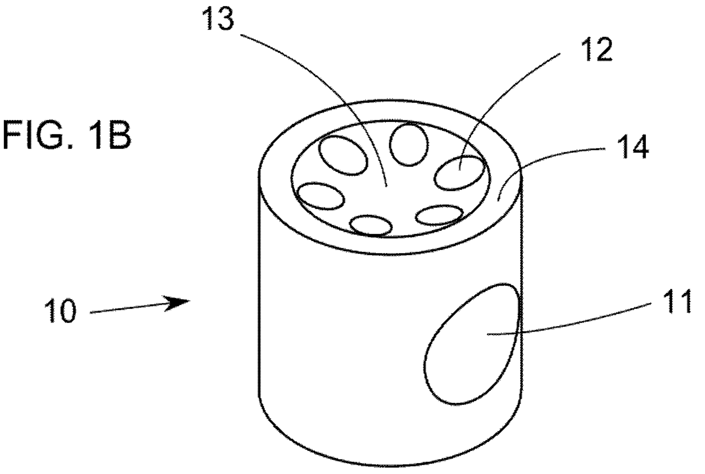
FIG. 1B is a perspective view of the electrode.
Figure 1C:
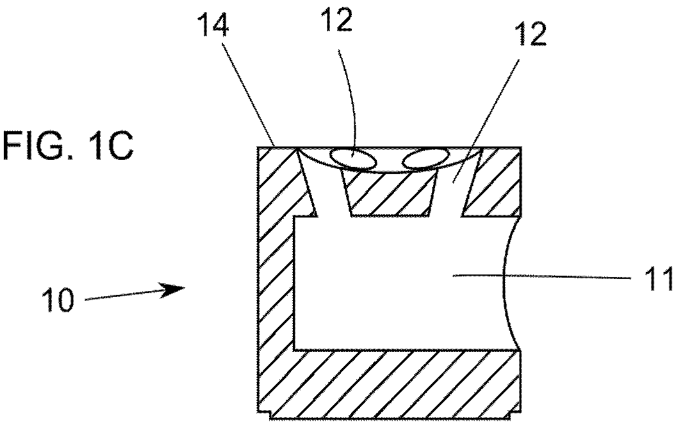
FIG. 1C is a side cross-sectional view of the electrode.
Figure 2:
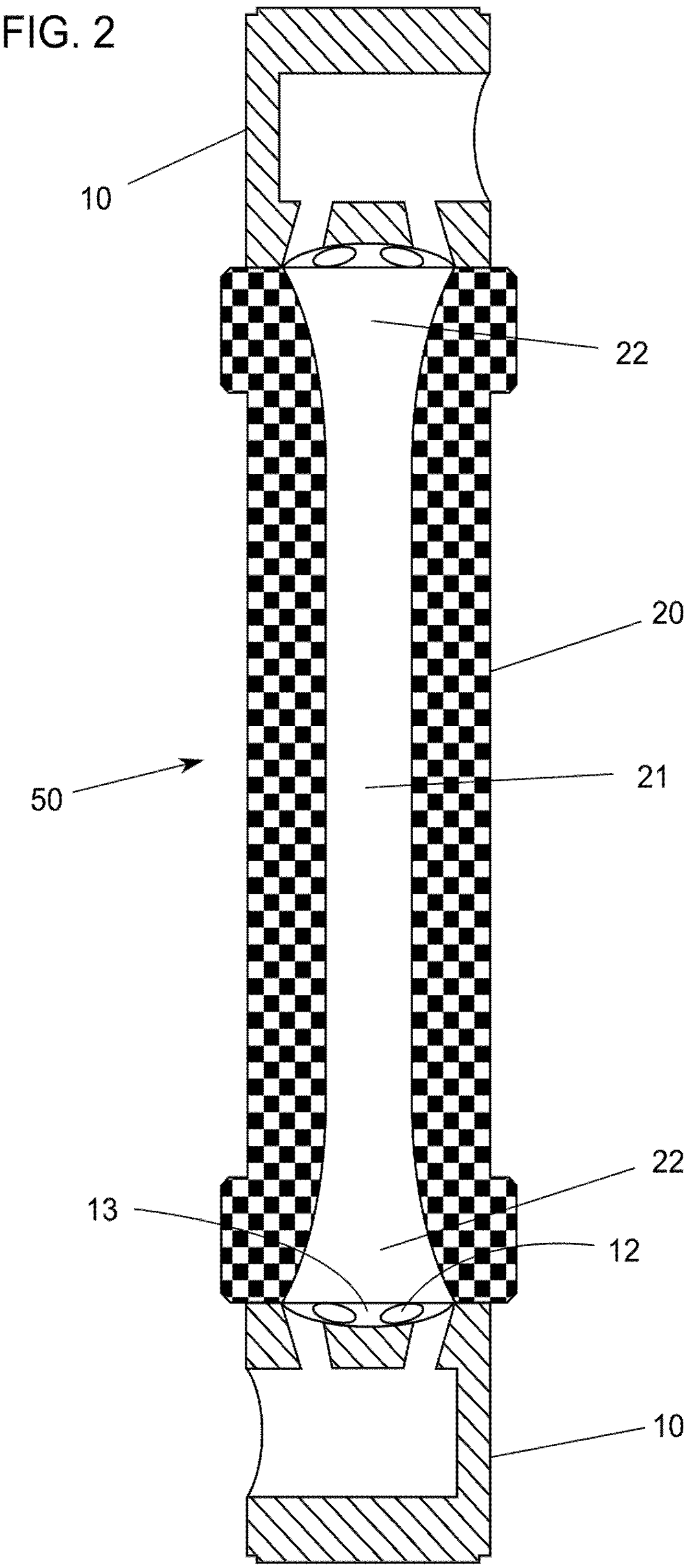
FIG. 2 is a side cross-sectional view of a cell with two electrodes.

With reference to FIG. 1, which is defined inclusively by FIGS. 1A, 1B and 1C, the electrode 10 is generally cylindrical and made of graphite. It comprises a duct 11 and several ports 12 fluidly connected to the duct inside the electrode. There is an angle of about 90° between the duct and the ports, for example of 73°-107°, and the ports are somewhat divergent as viewed from the duct. The outer openings of the ports 12 lie on a concave outer surface 13 of the electrode, which is the surface of the electrode that transmits most current to the conductive liquid that flows through the duct 11 and the ports 12. A peripheral flat surface 14 adjacent to the concave surface 13 is used for sealing abutment against a dielectric tube 20 that joins and fluidly connects two electrodes 10 (see FIG. 2).

The dielectric tube 20 comprises a central passage 21 and two wider ends 22 that, with a tapered configuration, connect the central region 21 to the concave surfaces 13 and the ports 12 of the electrodes 10. This assembly is and/or forms an ohmic-heating cell 50. In operation, one electrode is electrically connected to earth and the other electrode is electrically connected to the power supply, so that there is a current circulation through the liquid (for example fruit juice) that flows between the electrodes and through the dielectric tube 20.

Figure 3:
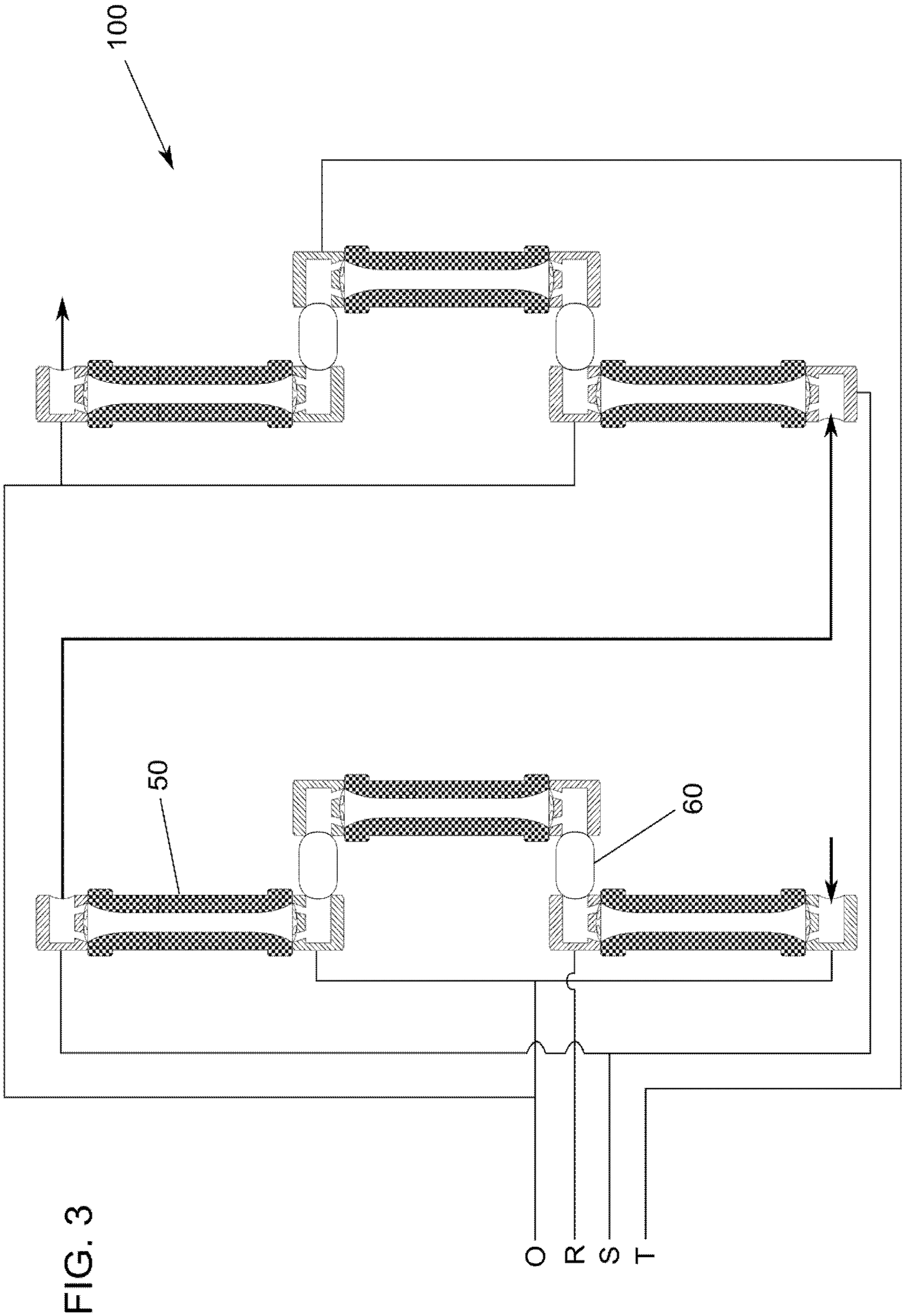
FIG. 3 is a schematic view of two groups of three cells.

It may be necessary to increase the temperature of the liquid from, for example, 50° C. to 105° C. in a very short time. This can be done with six cells 50 arranged in series, so that the temperature of the liquid is increased about 9° C. at each cell. FIG. 3 shows such an arrangement in the form of a structure 100.

Structure 100 comprises six cells 50 arranged in series. The two electrodes of any cell are at different potentials, but any two consecutive electrodes pertaining two different cells are at the same potential, i.e. electrically connected to the same phase R, S or T (or to the neutral O) of a triphasic power supply. FIG. 3 schematically shows the tubes 60 that connect, both fluidly and electrically, any such pair of consecutive electrodes. The first and the last electrode are connected to the neutral (earth), and thus a perfect electrical equilibrium is achieved among the phases.

Figure 4:
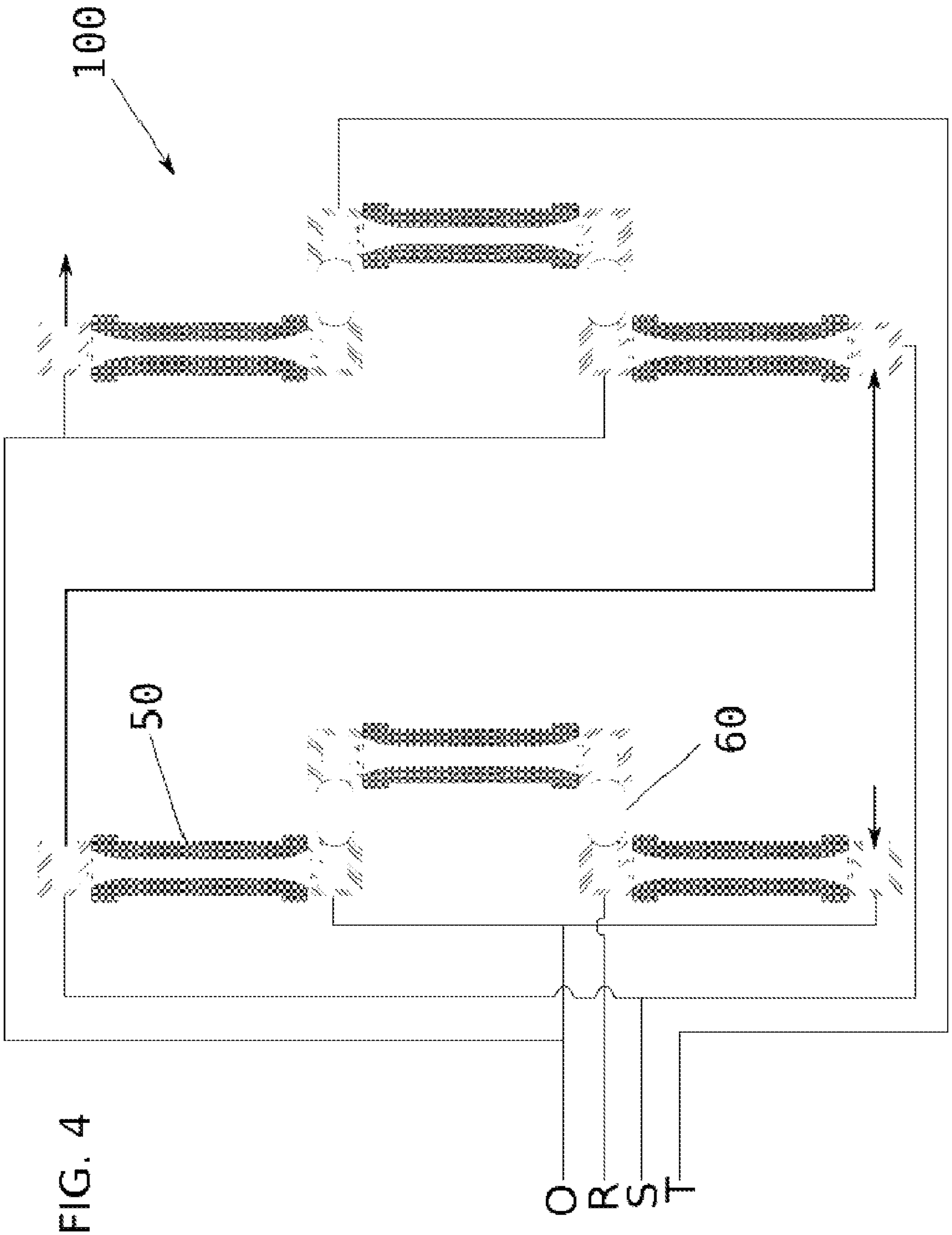
FIG. 4 is another schematic view of two groups of three cells.

It is well known that conductivity increases with temperature and also that is proportional to the cross-section area of the conductor. In the present case, the conductor is the cylinder of conductive liquid that flows through the central passage 21 of the dielectric tube 20. The conductivity of this liquid is higher downstream because the liquid has already been heated. Therefore, the increase of temperature of the liquid in a cell downstream is bigger than in a cell upstream, as long as the dimensions and the voltage are the same. There are basically two ways to achieve the same increase of temperature in all the cells: to decrease the voltage applied to the downstream cells or to decrease the cross-section area of the central passage 21 of the downstream cells as shown in FIG. 4. The latter arrangement would make the resistance of the cylinder of conductive liquid that flows through the central passage 21 of a downstream cell higher than that of an upstream cell if the liquid is at the same temperature; since the temperature of the liquid is progressively increased downstream, the width of the central passages 21 of the successive cells 50 can be suitably narrowed in order to have substantially the same temperature increase in all the cells. For example, the diameter of the central passage of the first cell can be 30 mm and the diameter of the central passage of the last cell can be 25 mm.

The cells are arranged with the dielectric tubes in a vertical disposition, one cell being placed higher than the preceding cell, so that the flow is forced to be upward. This facilitates the upward motion of the air bubbles that might be in the liquid, so that they can be easily extracted through the top of the cells. In order to prevent the structure 100 from being too high, the six cells can be divided in two groups of three cells placed at the same height, as shown in FIG. 3, in which the bold lines represent the pipes for the flow of the liquid and the sense thereof.

Although only particular embodiments of the invention have been shown and described in the present specification, the skilled person will be able to introduce modifications and substitute any technical features thereof with others that are technically equivalent, depending on the particular requirements of each case, without departing from the scope of protection defined by the appended claims.

The invention claimed is:

1. An electrode for the ohmic heating of a particulate liquid flowing therethrough, comprising an inlet and an outlet that are fluidly connected and are arranged so that there is a change of direction of 60°-120° between the inlet and the outlet, wherein the inlet is a duct and the outlet is a port or the inlet is a port and the outlet is a duct, and the port and the duct intersect; and wherein the port has an outer opening on an outer surface of the electrode, and said outer surface is concave.

2. The electrode according to claim 1, wherein the change of direction is of 73°-107°.

3. The electrode according to claim 1, wherein the ratio between the width of the duct and the width of the port is bigger than 3.

4. The electrode according to claim 1, which comprises at least six such ports.

5. The electrode according to claim 4, wherein the ports are divergent as viewed from the duct.

6. A cell for the ohmic heating of a particulate liquid flowing therethrough, comprising two electrodes according to claim 1 and a dielectric tube that fluidly connects the two electrodes.

7. An apparatus for the ohmic heating of a particulate liquid flowing therethrough, comprising a group of at least three cells according to claim 6, so that the three cells are fluidly connected in series.

8. The apparatus according to claim 7, wherein the middle cell is arranged higher than another cell and lower than the other cell.

9. The apparatus according to claim 8, wherein any cell is arranged with its dielectric tube in a substantially vertical disposition.

10. The apparatus according to claim 7, comprising at least a subsequent group of three cells that is fluidly connected to the antecedent group of three cells.

11. The apparatus according to claim 10, wherein the passage in the dielectric tube of any cell of the subsequent group is narrower than the passage in the dielectric tube of any cell of the antecedent group.

12. The apparatus according to claim 11, wherein any two consecutive electrodes pertaining to different cells are electrically connected by a conductive element.

13. A method of heating a flowing conductive liquid, comprising the use of an apparatus according to claim 7, and wherein the voltage applied to any cell is substantially the same.

14. The method according to claim 13, wherein the increase of temperature of the liquid at any cell is substantially the same.

15. The electrode according to claim 3, which comprises at least six such ports.

16. The electrode according to claim 15, wherein the ports are divergent as viewed from the duct.

17. The apparatus according to claim 7, wherein any cell is arranged with its dielectric tube in a substantially vertical disposition.

18. The apparatus according to claim 10, wherein any two consecutive electrodes pertaining to different cells are electrically connected by a conductive element.

* * * * *